3,004,282
SPRING COUNTERBALANCE HINGE
Edward MacCallum, Grosse Pointe Woods, Mich., assignor to General Motors Corporation, Detroit, Mich., a corporation of Delaware
Filed Aug. 10, 1960, Ser. No. 48,683
7 Claims. (Cl. 16—163)

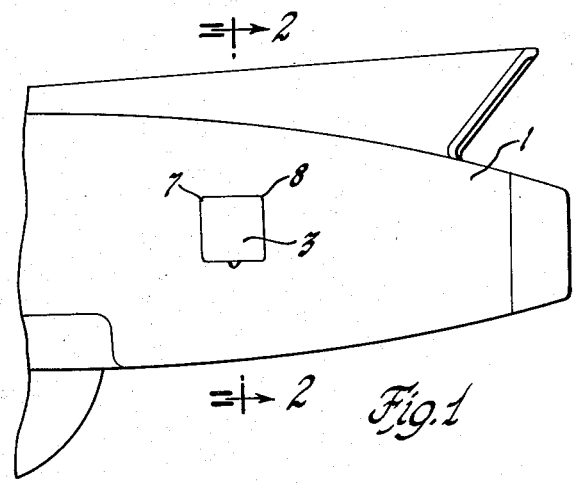
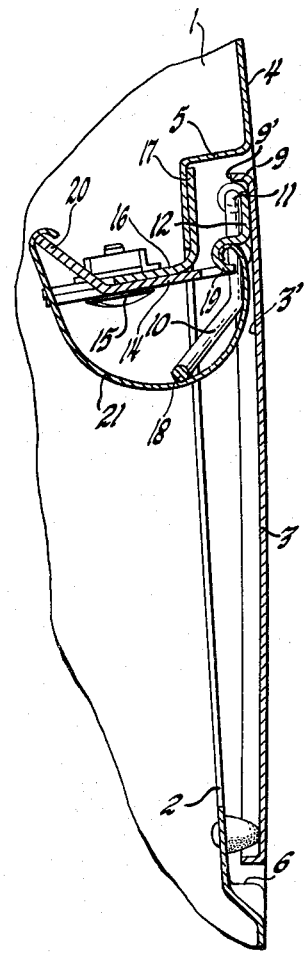
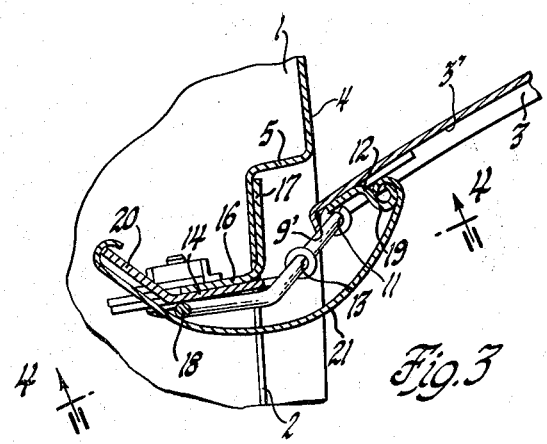
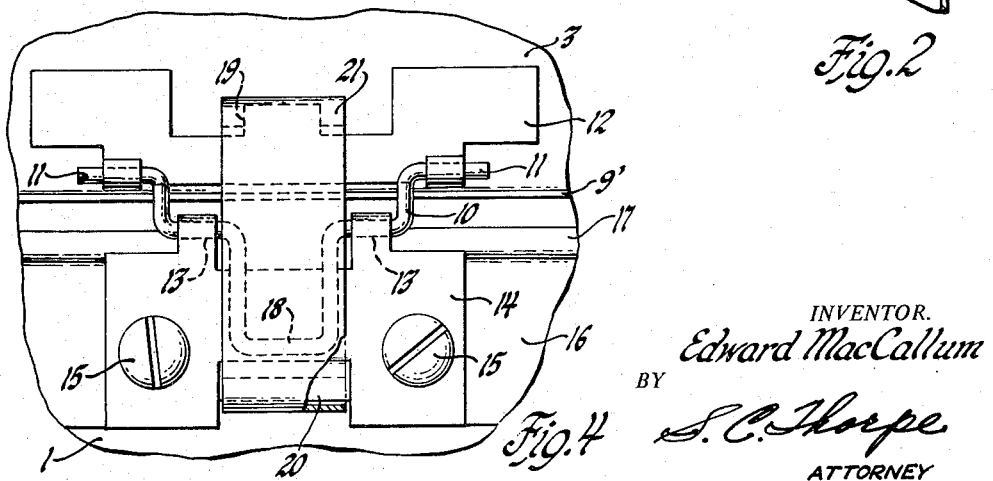
INVENTOR.
Edward MacCallum
BY
S. C. Thorpe
ATTORNEY United States Patent Office 3,004,282
Patented Oct. 17, 1961

This invention relates to hinge constructions of the spring counterbalanced type, and particularly to such a hinge wherein the hinge axis shifts laterally during operation.

The invention has particular utility for hinging a door which in closed position is desired to lie flush with a fixed panel forming the door opening, and which door during opening and closing must have its hinged side shift normally of the panel to avoid interference with the adjacent edges of the panel opening, and wherein it is also desired to incorporate means for holding the door alternatively in either its opened or closed position.

These and other objects and advantages are obtained with my novel hinge construction through employment of a cranktype hinge pin, or "rocker," having a first pivotal connection adjacent one of its ends to one of the hinged members and a second pivotal connection intermediate the ends of the rocker to the other of the hinged members, together with means interconnecting the members and operative upon the rocker in response to hinge opening movement of the members to effect pivotal movement of the rocker about its second pivotal connection to the other member and consequent lateral displacement of the axis of the first pivotal connection. By employing a flexible element of resilient material as the means which interconnects the hinge members and acts upon the rocker, both a hold-open and a hold-closed action is obtained.

For a complete understanding of the invention, reference is made to the following description and drawing, wherein:

FIGURE 1 is a side elevational view of the rear portion of an automotive vehicle showing a gas tank filler door in the body rear quarter panel, the hinging of which door has been selected to illustrate the preferred embodiment of my invention.

FIGURE 2 is an enlarged sectional view taken along line 2—2 of FIGURE 1, showing details of the hinge construction.

FIGURE 3 is a fragmentary sectional view similar to FIGURE 2, but showing the door in open position.

FIGURE 4 is an elevational view taken in the direction of the arrows 4—4 of FIGURE 3.

Referring now in detail to the drawing, an automobile body having a rear fender and quarter panel 1 is best shown in FIGURE 1. Normally closing a gas tank filler access opening 2 (FIGURES 2 and 3) in the panel is a door 3, it being understood that interiorly of the panel opposite the opening 2 is a filler pipe (not shown) leading to the automobile gas tank. The outer surface of the door 3 when in closed position desirably lies flush with the outer surface 4 of the panel 1 and has its lateral extremities terminating in close proximity to the inturned flanges 5 and 6 of the panel which serve to define the opening 2. Due to such close proximity, particularly at the corners 7 and 8 (FIGURE 1) of the door, it is important that opening and closing movements of the door must not cause interference between the edges of the door and the adjacent surfaces of the panel. Consequently during opening of the door, its hinged side 9 which is most adjacent the panel flange 5 must be displaced normally of the surface 4 to avoid such interference.

To accomplish this, a rocker 10 is provided which may conveniently be made from wire rod bent to a generally crank-like shape as best shown in FIGURE 4. The inner end portions 11 of the crank-shaped rocker are journaled in a bracket member 12 which is fixed (e.g. by welding) to the inner face 3' of the door. Intermediate its ends, the rocker 10 has portions 13 journaled in a second bracket member 14 which is removably fixed as by bolts 15 to one leg 16 of an angle plate whose other leg 17 is permanently attached (e.g. by welding) to the flange 5 of the fender panel. The opposite end or yoke portion 18 of the rocker extends inwardly of the opening 2 in the panel 1 from the pivotal connection afforded by the journaling of the rocker portions 13 in the second bracket member 14. This yoke end 18 of the rocker, during opening of the door, is engageable with the second bracket member 14 which thus serves as a stop therefor. Similarly, the inward extremity 9' of the door hinged side 9 is engageable with the rocker intermediate the pivotally connected portions 11 and 13 whereby the rocker, in turn, serves as a stop limiting opening movement of the door.

The door carrying bracket 12 has a hook-like projection 19 extending toward the free edge of the door from the pivotal connection afforded by journaling the rocker portions 11 in this bracket, and a somewhat similar projection 20 is provided on the second bracket member 14 extending further inwardly of the door opening from the rocker pivotal connection at 13. Hooked to these projections 19 and 20 are the respective ends of a flexible element 21 in the form of a rat-trap type spring. This spring element normally tends to assume a somewhat circular configuration, that is, with its ends even more closely adjacent than as shown in FIGURE 2, and thus when the door is in closed position, the element 21 operates to hold the door closed. During opening of the door the line defined by the ends of the spring element at their inner engagement with the projections 19 and 20 passes "over-center" of the pivotal connection 11, as well as of the pivotal connection 13, with the result that the door is held open by the spring. In doing so, it also, by being straightened to a more taut condition, operates against the yoke end 18 of the rocker during such movement to pivot the rocker about its connection 13 to move the pivotal connection 11 outwardly of the panel surface 4 so that opening movement of the door is precluded from causing interference of the door edge 9 with the panel flange 5.

It will thus be seen that my improved hinge construction provides both a double acting counterbalance effect to hold the door alternately in its opened or closed position, as well as means to laterally shift the door hinge axis out of the plane of the door opening in the panel as the door is opened.

While only a single preferred embodiment of the invention has been disclosed, it is appreciated that numerous minor changes in the construction and arrangement of the parts may be made without departing from the spirit and scope of the invention as defined in the following claims.

I claim:
1. In a hinge construction, two relatively movable members, a rocker having a pivotal connection adjacent one of its ends to one of the members and a pivotal connection intermediate its ends to the other of the members, and means interconnecting the members and operative upon the rocker in response to relative movement of the members in one direction about said first named connection to effect pivotal movement of the rocker relative to said other member and consequent relative movement of the members about said second named connection.

2. The invention of claim 1, wherein said means is of resilient material and has its connections to said members so located thereon relative to said rocker pivotal connections to the members that the hinge is both biased closed when in closed position and is biased open when in opened position.

3. In a hinge construction, two relatively movable members, a rocker having a pivotal connection adjacent one of its ends to one of the members and a pivotal connection intermediate its ends to the other of the members, and means interconnecting the members and operative upon the rocker adjacent the opposite end thereof in response to relative movement of the members in one direction about said first named connection to effect pivotal movement of the rocker relative to said other member and thereby effect relative movement of the members about said second named connection.

4. The invention of claim 3, wherein said other member is engageable by the opposite end of the rocker and said one member has a portion abuttable with the rocket intermediate the ends thereof to limit opening movement of the hinge.

5. In a hinge construction, two relatively movable members, a rocker pivotally connected adjacent one of its ends to one of the members and pivotally connected intermediate its ends to the other of the members, and an elongated flexible element having its ends connected to said members, respectively, the connections of said ends of the element to the members being located relative to the rocker pivotal connections to the members to cause said element to become more taut in response to pivoting of said one member in one direction about said rocker end, said element being engageable intermediate its ends with the opposite end of the rocker during pivoting of said one member about said rocker end in said one direction, whereby as the element becomes more taut the rocker is pivoted and the pivotal connection of the rocker to said one member is shifted relative to said other member.

6. The invention of claim 5, wherein said element is of resilient flexible material and is pre-stressed to oppose relative movement of its ends in the direction to cause the element to assume a more taut condition, and wherein said element end connections with the members are located to lie on the side of said pivotal connections to oppose opening of the hinge when the members are in their hinge-closed positions and to move to the opposite side of said pivotal connections during hinge-opening movement of the members to oppose closing of the hinge when the members are in their hinge-open positions.

7. In a hinge construction, two relatively movable members, a rocker, a pivotal connection between one end of the rocker and one of the members accommodating relative movement of the members about a first axis, a pivotal connection between the other of the members and the rocker intermediate the ends of the rocker accommodating relative movement of the members about a second axis parallel to the first axis, and means operative in response to relative movement of the members about the first axis to effect relative movement of the members about the second axis, said means including an elongated flexible element connected at one end to said one member and at its opposite end to said other member, said element being engageable intermediate its ends with the rocker on the opposite side of said second axis from said first axis and having its end connections with the members located to move away from each other during relative movement of the members in one direction about the first axis, whereby as the element becomes more taut the rocker is pivoted thereby about the second axis to effect relative movement of the members also about the second axis.

References Cited in the file of this patent
UNITED STATES PATENTS

| 2,144,481 | Bryant | Jan. 17, 1939 |
| 2,743,476 | Turner | May 1, 1956 |